G. A. BISHOFF.
MEANS FOR HANDLING STRAW AND THE LIKE.
APPLICATION FILED DEC. 5, 1916.

1,249,271.

Patented Dec. 4, 1917.
3 SHEETS—SHEET 1.

G. A. BISHOFF.
MEANS FOR HANDLING STRAW AND THE LIKE.
APPLICATION FILED DEC. 5, 1916.

1,249,271.

Patented Dec. 4, 1917.
3 SHEETS—SHEET 2.

G. A. BISHOFF.
MEANS FOR HANDLING STRAW AND THE LIKE.
APPLICATION FILED DEC. 5, 1916.

1,249,271.

Patented Dec. 4, 1917.
3 SHEETS—SHEET 3.

Witness:
R. Hamilton

Inventor,
G. A. Bishoff.
By Chas. W. Gerard
Attorney.

UNITED STATES PATENT OFFICE.

GEORGE A. BISHOFF, OF KANSAS CITY, MISSOURI, ASSIGNOR TO SIMPLEX SPREADER MANUFACTURING COMPANY, OF KANSAS CITY, MISSOURI, A CORPORATION OF MISSOURI.

MEANS FOR HANDLING STRAW AND THE LIKE.

1,249,271.  Specification of Letters Patent. Patented Dec. 4, 1917.

Application filed December 5, 1916. Serial No. 135,121.

*To all whom it may concern:*

Be it known that I, GEORGE A. BISHOFF, a citizen of the United States, residing at Kansas City, in the county of Jackson, State of Missouri, have invented certain new and useful Improvements in Means for Handling Straw and the like, of which the following is a full and exact specification.

The present invention relates to straw unloading and spreading devices, and aims to provide an improved construction for the handling of straw, manure and like material, with particular reference to the unloading of such material from farm wagons and imparting a spreading action to the material as it leaves the wagon. Accordingly, one of the objects of the invention is to devise an unloading means operating in an improved manner for conveying the material from the load by unloading the same from the top downward. To this end a construction is provided which is adapted to engage and convey the material by operation from the top of the load and downward through the same, this conveying means operating with a self-feeding movement acting to maintain the conveying means in proper engagement with the top of the remaining portion of the load.

A further object of the invention is to produce a combined unloading and spreading construction in which the material is unloaded by means which feeds downward through the load to convey the material to the spreading means, while the delivery end of the conveying means is maintained in substantially constant relation to the spreading means throughout the unloading operation.

It is also an object to provide an unloading construction of the type described with means for effectively driving the same through the movement of the wagon, said means comprising connections for driving the apparatus from the wheels at the opposite sides of the wagon and including provision taking care of the differential movement of the wheels, to the end that the apparatus will be driven from both wheels when moving at the same speed, or from the faster moving wheel when the rate of one exceeds that of the other.

A further object is to provide means for convenient control of the drive connections from the driver's seat at the front of the wagon, as well as means for regulating the position of the unloading or conveying device, when desired.

It is also sought to produce a simple, compact and durable construction of as few parts as possible for effecting the desired purpose, and which will therefore be of an economical character and inexpensive to manufacture, the present application being a continuation, so far as common subject matter is involved, of my application Serial No. 116,197, filed August 21, 1916.

With these general objects in view, the invention will now be described with reference to the accompanying drawings illustrating one form of embodiment of the improvements, after which those features and combinations of parts deemed to be novel will be set forth and defined in the appended claims.

In the drawings—

Fig. 4 is a front view of the wagon bed, on a larger scale, showing the arrangement of the means provided for operating the clutch control and for regulating the position of the conveying or unloading means;

Figure 1:
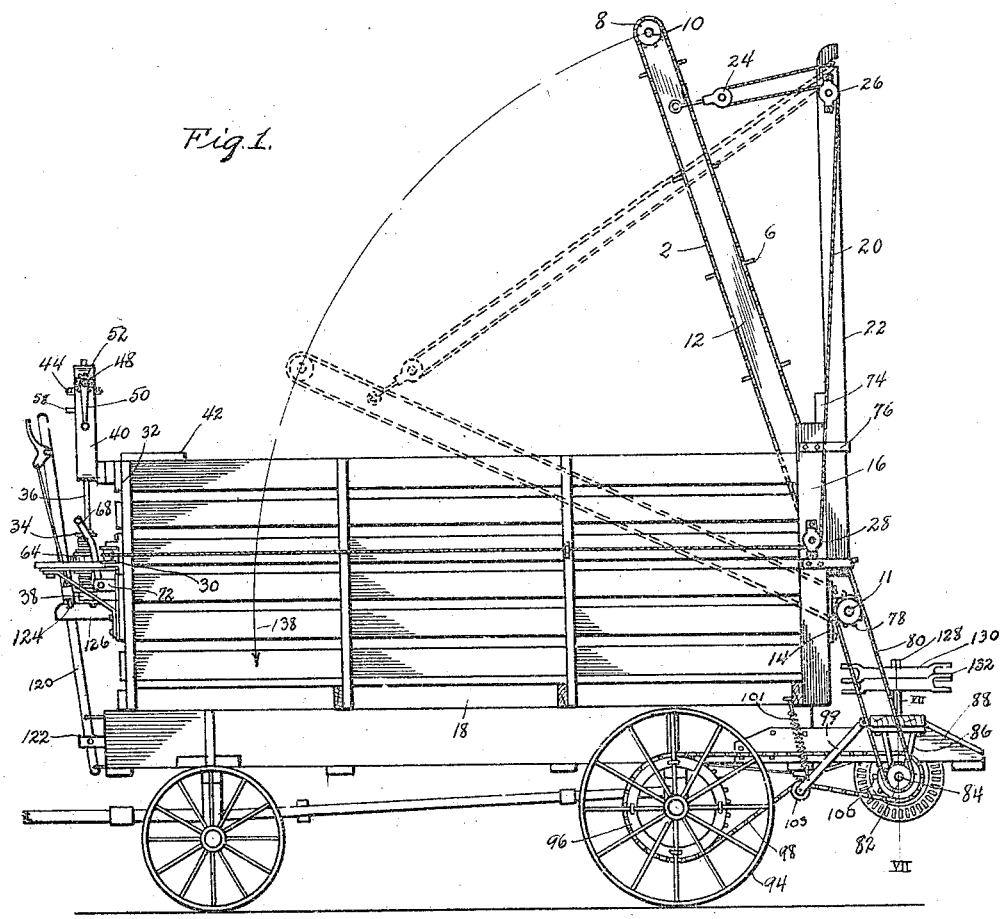
Figure 1 is a side elevation of a farm wagon provided with an unloading and spreading means constructed in accordance with the present invention.
Figure 2:
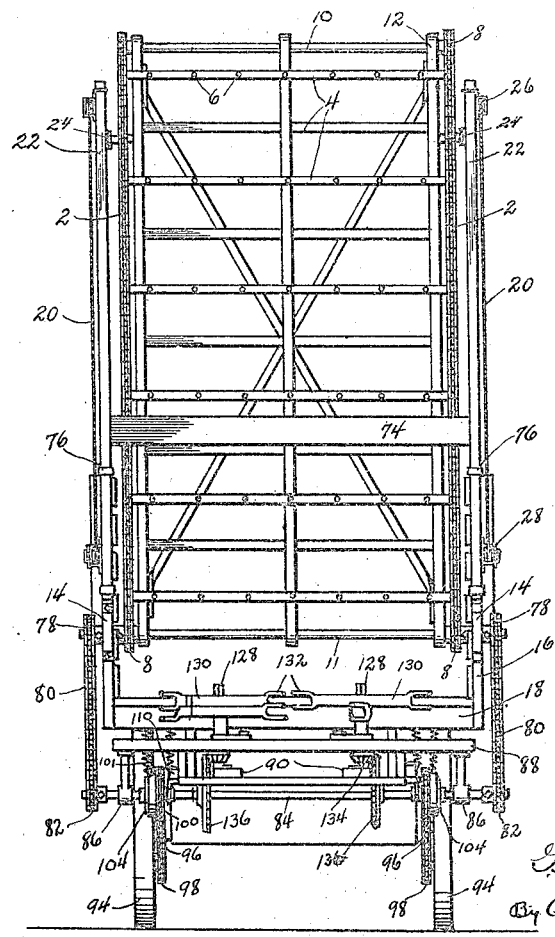
Fig. 2 is a rear elevation of the same.
Figure 6:
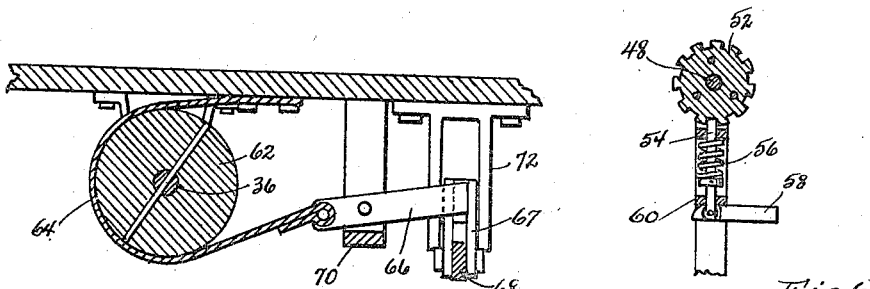

Referring to the drawings in detail, and more particularly to Figs. 1 and 2, these illustrate the improved conveying or unloading device as comprising an endless conveyer made up of a pair of sprocket chains 2, 2, connected by a series of conveyer flights 4 each provided with a plurality of teeth or fingers 6 for engagement with the straw, manure or other material being handled. The chains 2 are carried by sprocket wheels 8 mounted on the shafts 10 and 11, which are journaled in the opposite ends of a swinging carrier frame 12, the lower shaft 11 being of a length adapted to extend through bearings 14 secured to the corner uprights 16 at the opposite sides of the rear end of the wagon bed 18. The carrier frame 12 is thus supported for pivotal or swinging movement about the axis of the shaft 11. For regulating the position of this frame 12, as in raising or lowering it into or out of operative position, a pair of cables 20 is provided, the same being attached to the upper ends of posts 22 and passed through sheaves 24 swivelly connected to the opposite sides of said frame 12, thence over pulleys 26 adjacent the upper ends of said posts 22, thence around pulleys 28 mounted on the outer faces of the uprights 16, thence around pulleys 30 mounted on the front corner uprights 32 of the wagon bed, from which points said cables are carried in opposite directions around the winding drums 34 (see Fig. 4). The drums 34 are secured to the vertical shaft 36 journaled in the bearing brackets 38 and 40 secured to the front of the wagon bed adjacent the driver's seat 42. This shaft 36 is provided with a bevel gear 44 meshing with a bevel gear 46 on a short shaft 48 mounted in the bracket 40 and provided with an operating handle 50. The shaft 48 is also fitted with a ratchet wheel 52 adapted to be engaged by a locking pin 54 mounted slidingly in the bracket 40 and normally actuated into such engagement by means of the spring 56 (see Fig. 6), whereby the shaft 36 is held locked in any given position. For releasing the locking pin, the same is connected to a cam lever 58 adapted to coact with a lug 60 on the bracket 40 in retracting the pin.

Figure 5:
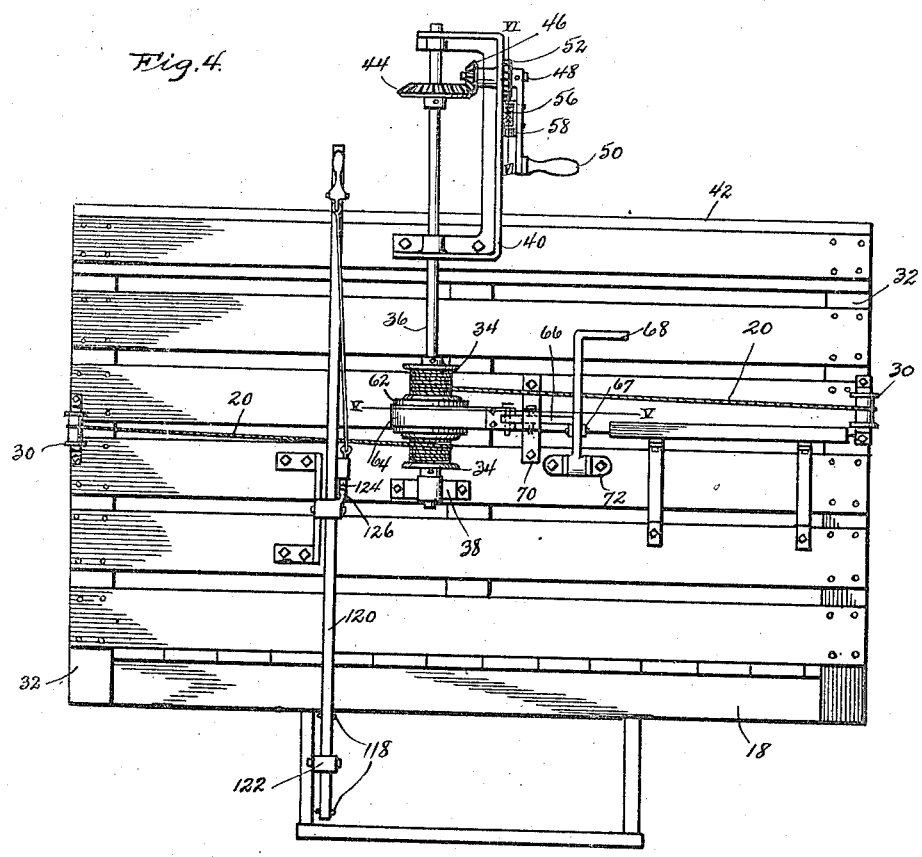
Figs. 5 and 6 are detail sectional views, on a still larger scale, taken on the lines V—V and VI—VI, respectively, of Fig. 4.

For further controlling the action of the shaft 36, as when the carrier frame is lowered, said shaft is equipped with a brake drum 62, to which is applied the brake band 64, the latter being connected through a lever 66 and links 67 (see Fig. 5) to a foot lever 68, for operation in an obvious manner, said levers 66 and 68 being pivoted in bracket extensions 70 and 72, respectively, secured to the front of the wagon bed. The posts 22 may be connected by a transverse member 74, as shown in Fig. 2, and these posts are removably mounted in the yokes 76 secured to said corner uprights 16.

Figures 7, 8:
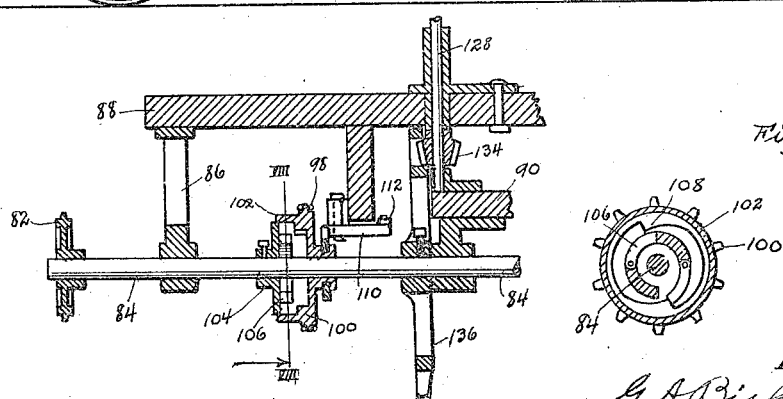
Fig. 7 is a section on the line VII—VII of Fig. 1, but taken on a larger scale.
Fig. 8 is a section on the line VIII—VIII, of Fig. 7.
Figure 3:
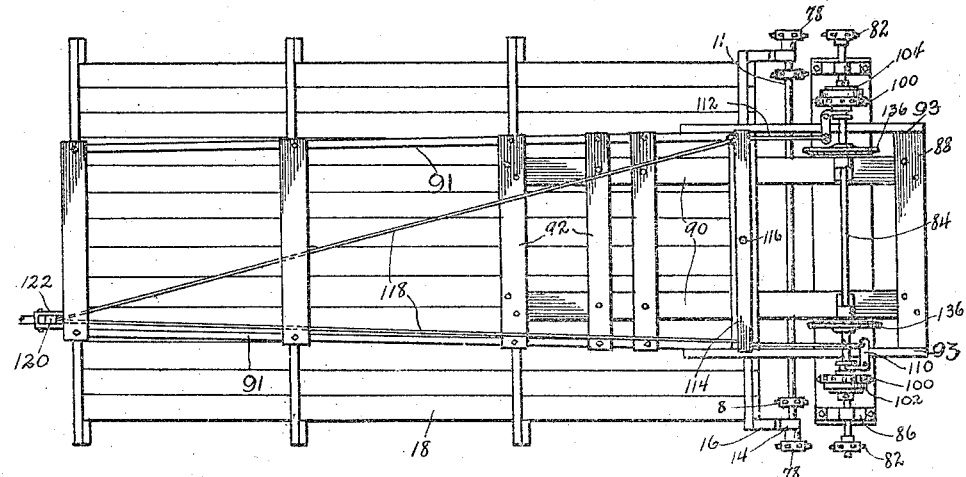
Fig. 3 is an inverted plan view of the wagon bed and showing only those parts necessary to illustrate the clutch control for the driving mechanism.

The projecting outer ends of the shaft 11 are provided with sprocket wheels 78 engaged by the sprocket chains 80 driven from sprocket wheels 82 secured to the opposite ends of a shaft 84 journaled with hangers 86 depending from the framework 88 which supports the spreader means hereinafter described. This framework 88 is conveniently secured to the wagon bed by having the longitudinal members 90 of said framework projected in underneath the wagon bed and secured to the crossbars 92 connecting the longitudinal sills 91 of the wagon, and also having the side pieces 93 of said framework secured to said sills 91, as shown in Figs. 1 and 3. The shaft 84 is driven from both rear wheels 94 of the wagon, for which purpose sprocket rings 96 are secured to said wheels in any suitable manner, for accommodating the sprocket chains 98, which also operate around sprocket wheels 100 loosely journaled upon said shaft 84. These latter sprocket wheels 100 are each formed with an annular flange 102 projecting laterally for slidingly embracing a clutch disk 104 secured to said shaft 84, each disk 104 being provided with a pair of clutch pawls 106 (see Fig. 8) adapted, when the parts are moved into clutched relation, to engage with internal shoulders 108 formed on the corresponding sprocket wheel 100. The arrangement is such that when the wagon wheels 94 are moving at the same rate of speed, with the sprocket wheels 100 in clutching relation with the disks 104, the shaft 84 will be driven by the combined action of both the drive chains 98; but when the rate of one of the wheels 94 exceeds that of the other, as when the wagon is turning, the shaft 84 will be driven through the action of the faster moving wheel, the clutch disk 104 corresponding to the slower wheel simply rotating idly within the corresponding sprocket wheel 100.

Means is provided for throwing the clutch parts into or out of clutching relation by the operation of connections leading to the driver's seat, this means comprising oppositely arranged bell crank levers 110 (see Figs. 3 and 8) having forked portions engaging the grooved hubs of the sliding sprocket wheels 100, said levers being mounted on the framework 88 and connected by rods 112 with the opposite ends of a transverse rocker arm 114 pivoted at 116 to the wagon bed; the opposite ends of this rocker arm 114 are connected by rods 118 to the lower end portion of a hand lever 120 at points above and below, respectively, the fulcrum of said lever, which is supported within a bracket 122 at the front end of the wagon, a suitable pawl 124 and ratchet 126 being provided for latching the lever in either of its positions.

The type of spreader construction employed is in the main similar to that shown in the patent to L. D. Rice, No. 1170673, issued February 8, 1916,—the same comprising a pair of vertical shafts 128 journaled in the frame-work 88 and provided each with a plurality of radially extending arms 130 terminating in the forks 132 adapted, on rotating with the shafts 128, to engage the straw, or other material being handled, at the delivery end of the unloading conveyer, and effectively spread the material in the manner explained in said patent. The lower ends of said shafts are provided with bevel gears 134 which mesh with master gears 136 secured to the transverse shaft 84.

It will thus be apparent that a simple, compact and efficient arrangement and construction have been devised for carrying out the desired objects of the invention. When the unloading or conveying means is not in use, the same is swung by means of the crank 50 into the position represented by the full lines in Fig. 1. In starting the unloading operation, the carrier frame 12 is lowered in the direction of the arrow 138, in Fig. 1, as indicated by the broken lines in said figure, to bring the conveyer down upon the top of the load, with the lower run of said conveyer in engagement with the material forming the load. The drive arrangement is such as to drive the lower run of the conveyer rearward in the direction of the spreading means, and as the material is thus delivered to the spreading means the carrier frame and conveyer automatically settle gradually downward, as fast as the material is unloaded, resting always upon top of the material forming the remaining portion of the load with the lower run of the conveyer continually engaged therewith, while the delivery end of the conveyer maintains its position with relation to the spreading means practically unchanged. This arrangement of the unloading apparatus is a decided improvement over the type generally known, since the device feeds itself automatically, no adjustments of position being required after starting its operation, and less power being required to operate it than is the case with devices unloading the material from the bottom of the load. An efficient drive is obtained by providing driving connections from the wheels at both sides of the wagon, so that the combined effort of the two rear wheels is utilized for driving the apparatus, so long as said wheels are turning at the same rate of speed, while in the case of unequal rates of speed the connections are so arranged that the slower wheel will not retard the driving action being exerted by the faster wheel. The said driving connections are readily thrown into and out of clutched relation by the control means arranged within the driver's reach. The frame supporting the spreading mechanism is such as may be conveniently applied to or removed from the wagon, due to the manner of mounting and securing said frame beneath the wagon bed as described, and it will also be understood that the posts 22 may likewise be readily removed, as when the carrier frame is lowered into the wagon and the latter is being driven in an empty condition, or in case it should be desired to take out the unloading aparatus and use the wagon for other purposes.

While I have illustrated and described what is now deemed to constitute the preferred form of embodiment of the improvements, the right is reserved to all such formal changes and modifications as may fairly fall within the scope of the appended claims.

Claims:

1. In an apparatus for unloading and spreading straw and the like, the combination of straw spreading means comprising a plurality of rotating arms, straw unloading means mounted for swinging movement about an axis located adjacent to and slightly in advance of said spreading means whereby said unloading means may be fed progressively through the load, means for actuating said unloading means to feed the straw out past said axis to said rotating arms, and means for rotating said arms about an axis at right angles to the axis of said unloading means.

2. In an apparatus for unloading and spreading straw and the like, the combination of straw spreading means comprising a plurality of horizontally extending arms, straw unloading means mounted for swinging movement about a horizontal axis adjacent said spreading means whereby said unloading means may feed straw to said spreading means from the top of the load downward, means for actuating said unloading means to feed the straw out beneath said axis to the spreading means, and means for rotating said arms about a vertical axis.

3. In an apparatus for unloading and spreading straw and the like from farm wagons, the combination of straw spreading means comprising a plurality of horizontally extending arms mounted approximately on a level with the bottom of the wagon bed at one end thereof, straw unloading means mounted for swinging movement about a horizontal axis located adjacent to and slightly in advance of said spreading means whereby said unloading means may feed straw to said spreading means from the top of the load downward, means operated by the movement of the wagon for actuating said unloading means to feed the straw out beneath said axis to the spreading means, and means for rotating said arms about a vertical axis.

4. An apparatus for unloading and spreading straw from farm wagons comprising, in combination, a conveyer frame mounted for pivotal movement about a horizontal axis at one end of the wagon bed and slightly above the bottom thereof, an endless conveyer carried by said frame, means for driving said conveyer to engage the lower run thereof with the straw and feed the latter out of the wagon through the space below said axis, and straw spreading means comprising a plurality of horizontal arms mounted at the rear of said end of the wagon and directly opposite said space and in the path of said straw as fed by said conveyer, and means for rotating said arms about an axis at right angles to the axis of said frame.

5. In an apparatus for unloading and spreading straw and the like from farm wagons, the combination of straw spreading means comprising a plurality of horizontally extending arms mounted approximately on a level with the bottom of the wagon bed at one end thereof, a conveyer frame mounted for pivotal movement about a horizontal axis at said end of the wagon bed and slightly above the bottom thereof, an endless conveyer carried by said frame, means for driving said conveyer to engage the lower run thereof with the straw and feed the latter beneath said axis to said spreading means, and means for rotating said arms about an axis at right angles to the axis of said frame, said driving means and rotating means including differential connections with the wheels at opposite sides of the wagon arranged to drive both said conveyer and said spreading means simultaneously and always from the faster moving wheel.

6. An apparatus for unloading and spreading straw from farm wagons comprising, in combination with the wagon bed having longitudinal sills and transverse members connecting the lower edges of said sills, straw spreading means, a frame for carrying said spreading means and provided with extensions projecting beneath the wagon bed and supported on said transverse members for presenting said spreading means at approximately the level of the bottom of said bed, said frame also having arms projecting alongside said sills and secured thereto, and means operated by the movement of the wagon for actuating said spreading means.

7. In an apparatus for unloading straw and the like from farm wagons, the combination of a conveyer frame mounted for pivotal movement about an axis at one end of the wagon bed and slightly above the bottom thereof, an endless conveyer carried by said frame, means operated by the movement of the wagon for driving said conveyer to engage the lower run thereof with the straw and feed the latter out through the space beneath the axis of said frame, an upright member detachably connected to the wagon at the discharge end of said conveyer and provided with a pulley adjacent the upper end of said upright member, a pulley swiveled to said frame, and a cable secured to the upper end of said upright and operating around said pulleys, said cable being operable from the driver's position for regulating the position of said frame.

GEORGE A. BISHOFF.

Copies of this patent may be obtained for five cents each, by addressing the "Commissioner of Patents, Washington, D. C."